No. 846,405. PATENTED MAR. 5, 1907.
S. L. DUCKETT.
CHECK ATTACHMENT TO VEHICLES.
APPLICATION FILED MAR. 17, 1906.
2 SHEETS—SHEET 2.
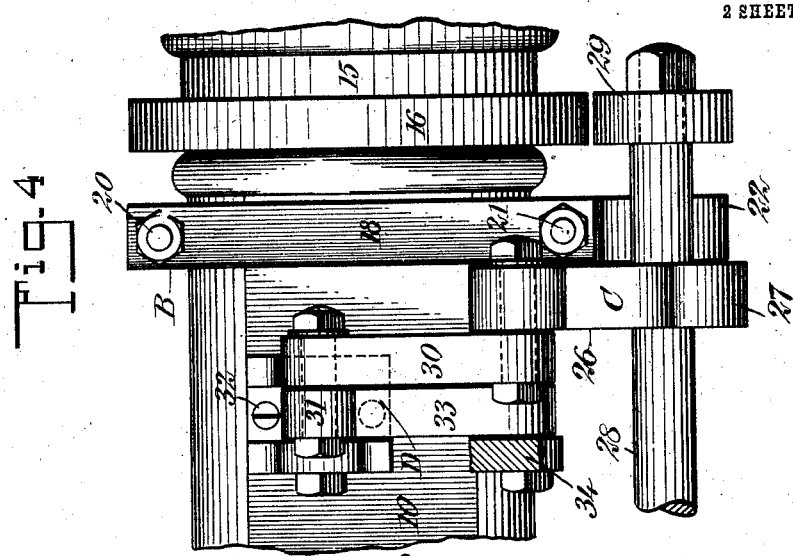
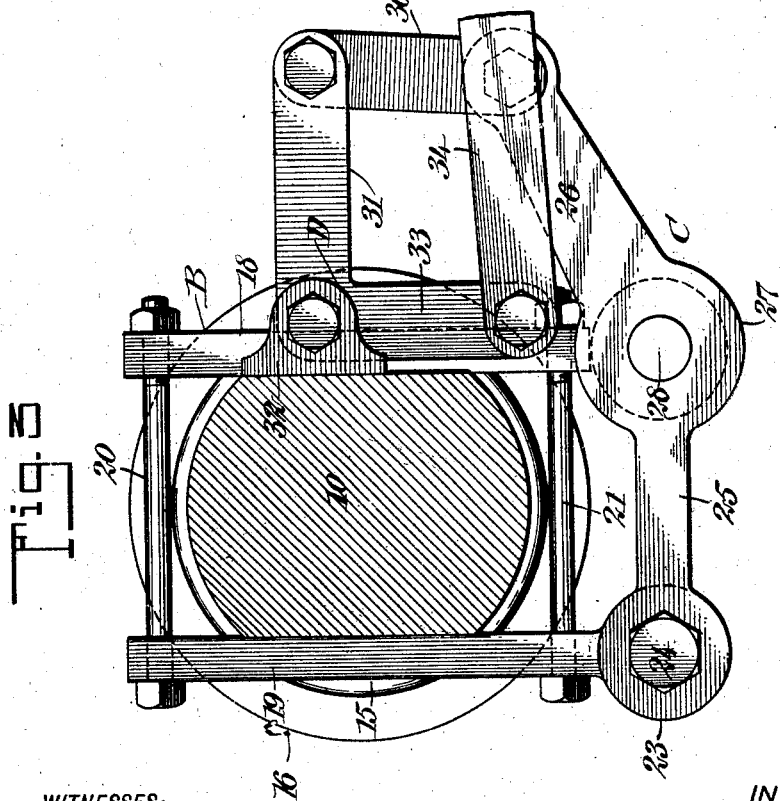
WITNESSES:
INVENTOR
Samuel L. Duckett
BY
ATTORNEYS

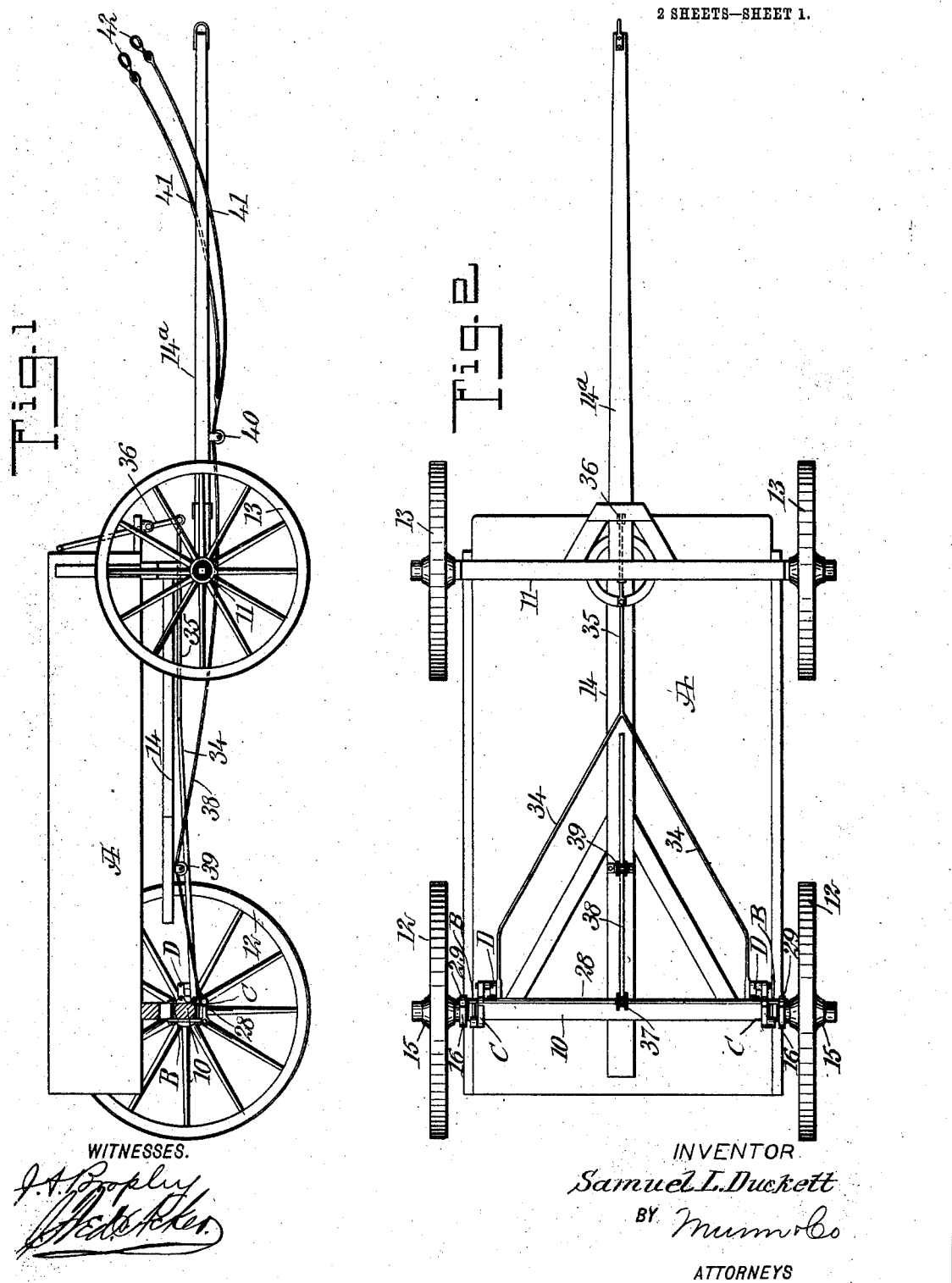

UNITED STATES PATENT OFFICE.

SAMUEL LUTHER DUCKETT, OF GOLDFIELD, COLORADO, ASSIGNOR OF ONE-HALF TO WILLIAM J. KERMODE, OF VICTOR, COLORADO.

CHECK ATTACHMENT TO VEHICLES.

No. 846,405.      Specification of Letters Patent.      Patented March 5, 1907.

Application filed March 17, 1906. Serial No. 306,575.

*To all whom it may concern:*

Be it known that I, SAMUEL LUTHER DUCKETT, a citizen of the United States, and a resident of Goldfield, in the county of Teller and State of Colorado, have invented a new and useful Check Attachment to Vehicles, of which the following is a full, clear, and exact description.

The purpose of the invention is to provide an attachment to vehicles adapted for use in checking horses should they attempt to run away while being driven or when left standing and to provide a device for such purposes which will be simple, durable, and economic and which can be brought into action by the foot while the driver still holds the reins.

Another purpose of the invention is to provide a construction readily adapted to any vehicle and which in action will check the speed of the frightened animals gradually, thus avoiding injury to the animals and a tendency to throw the occupants from the vehicle by reason of a too sudden stoppage.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vehicle having the improvement applied, the rear axle being in transverse section. Fig. 2 is a bottom plan view of the vehicle and the attachment applied. Fig. 3 is an enlarged transverse section through the axle adjacent to the hub of the wheel and a side elevation of that portion of the attachment applied to the axle, and Fig. 4 is a front elevation of that portion of the device illustrated in Fig. 3 drawn also upon an enlarged scale.

A represents the body of a wagon having a rear axle 10 and a forward axle 11, the rear axle being provided with the customary supporting-wheels 12 and the forward axle with similar wheels 13. A reach 14 is also employed and a tongue or pole 14ᵃ. I desire it to be understood, however, that while the attachment is shown applied to a wagon it may be applied to any type of vehicle.

By preference the attachment is made to the rear axle 10. The hubs 15 of the supporting-wheels 12 on this axle are each provided with a metal band 16 of any desired thickness, and adjacent to the hub of each wheel 12 a bracket B is secured upon said rear axle 10, which brackets each consists of front and rear parallel vertical bars 18 and 19, connected by bolts 20 and 21, one located above and the other below the axle, as is best shown in Fig. 3. The rear member 19 of each bracket B extends down below the forward member and terminates in an eye 22, and this portion of each bracket is adapted for hinged connection with an angle-arm C. Each angle-arm C is provided at its rear end with an eye 23, and each angle-arm C is pivoted to the bracket B by passing suitable bolts 24 through the eyes 23 of the said arms and the eyes 22 of the member 19 of the brackets. Each arm C consists of a rear horizontal member 25 and an upwardly and forwardly extending member 26, and each arm C has an enlargement 27 where its two members join.

In the enlargements 27 of the arms C the end portions of a shaft 28 are mounted to turn, and this shaft 28 is provided at each of its ends with a friction-roller 29, of any suitable material. The said friction-rollers 29 are adapted by the movement of the arms C to be brought into frictional engagement with the bands 16 of the hubs of the rear wheels 12, so as to turn the shaft 28 at said time by such frictional engagement.

The forward end of each shaft-supporting arm C is pivotally attached to the lower end of a link 30, and the upper end of each link 30 is pivoted to the forward end of the horizontal member 31 of an elbow-lever D, and each elbow-lever D is fulcrumed in a bracket 32, which brackets are secured to the forward face of the rear axle, and the lower end of the vertical member 33 of the elbow-lever D is pivotally attached to the inner end of a draft-rod 34. These draft-rods 34, as is shown in Fig. 2, are carried forward and are brought together beneath the arch 14, where they are connected with a single forwardly-extending rod 35, and this latter rod is pivotally attached to a foot-lever 36, extending up within convenient reach of the driver. Instead of a foot-lever a hand-lever may be employed, if desired, to raise the shaft 28 and cause its rotation through the action of the rear wheels 12.

The shaft 28 is provided at its center with a peripherally-grooved pulley 37, and one end of a strap 38 is secured to this pulley. Said strap 38 is carried forward over friction-rollers 39, secured to the reach, and, if a pole is employed, over a friction-roller 40, secured to the pole. This strap 38 is bifurcated at its forward end, so as to provide two members 41, each terminating in a snap 42, and said snaps are adapted to be attached to the bit-rings of the bridle.

Thus in operation should a team prove obstreperous or attempt to run away in order to check them it is simply necessary to raise the shaft 28 by means of the lever 36 to bring the friction-rollers 29 into engagement with the bands 16 on the rear wheels, whereupon the shaft 28 will be revolved, and the rear end portion of the strap 38 will be wound upon said shaft, thus drawing upon the bits of the team, effectually stopping the animals by drawing them backward until they halt.

Having thus described my invention, I claim as new and desire to secure by Letters Patent—

1. In a check attachment for vehicles, a shaft, pivoted carrier-arms for the said shaft, friction-wheels carried by the shaft, elbow-levers supported on the rear axle of the vehicle and connected with the carrier-arms, means for moving the elbow-levers to raise the carrier-arms, and a strap secured at one end to the shaft, its other end being bifurcated and provided with means for attachment to the bit of a harness.

2. In a check attachment for vehicles, a shaft, pivoted carrier-arms for the said shaft supported from the rear axle of a vehicle, friction-wheels carried by said shaft, brackets secured to the forward face of the rear axle of the vehicle, elbow-levers fulcrumed in said brackets and connected with the carrier-arms to move the same to bring the friction-wheels into or out of engagement with the hubs of the wheels of the vehicle, means for actuating the elbow-levers and a strap bifurcated at its forward end and provided with means for attachment to the rings of a bit, the opposite end of the strap being attached to said shaft.

3. In a vehicle, the combination with the rear axle, its supporting-wheels and bands on the supporting-wheels, of carrier-arms pivotally attached to the axle, a shaft mounted in the said carrier-arms, friction-rollers on the shaft, adapted for engagement with the bands on said wheels, elbow-levers supported on the rear axle and connected by links with said carrier-arms, a lever, connections between the said lever and the said elbow-levers to move the latter to raise and lower the carrier-arms and the shaft, a strap attached to the said shaft, bifurcated at its forward end, and fastening devices at the bifurcated end of the strap, for attachment to the harness.

4. In a vehicle, the combination with the axle thereof, wheels loosely mounted on the axle, bands on the said wheels, carrier-arms pivotally supported from the said axle, a shaft journaled in the carrier-arms, brackets secured to the forward face of the axle, elbow-levers fulcrumed on said brackets and each having a horizontal and a vertical member, link connections between the horizontal members of the elbow-levers and the carrier-arms, and friction-rollers carried by the said shaft, adapted for engagement with the bands on the said wheels, of a pulley on the said shaft, a strap secured to the said pulley, provided with means at its opposite end for attachment to a harness, an operating-lever, and connections between the said operating-lever and the said vertical members of the elbow-levers to move the elbow-levers to raise and lower the said carrier-arms.

5. In a vehicle, the combination with an axle and its supporting-wheels, bands secured on the hubs of the said wheels, carrier-arms pivotally supported beneath the axle, a shaft journaled in said carrier-arms, a pulley located between the ends of the shaft, and friction-wheels mounted on the end portions of the shaft, for engagement with the said bands on the wheels, of elbow-levers supported on the axle, link connections between the elbow-levers and the said supporting-arms, an operating-lever, link connections between the operating-lever and the elbow-lever, a strap, and guides for the said strap, one end of which strap is secured to said pulley on the said shaft, the opposite end of the strap being provided with means for attachment to the harness.

6. In a check attachment for vehicles, brackets adapted to be secured to a vehicle-axle, carrier-arms pivotally connected at their rear ends with said brackets, the said carrier-arms each consisting of a rear horizontal member and an upwardly and forwardly extending member, the said arms each having an enlarged portion at the junction of its members, a shaft mounted to turn in the enlarged portions of the carrier-arms, friction-wheels carried by said shaft, elbow-levers supported by the vehicle-axle and each having a forwardly-extending horizontal member and a downwardly-extending member, connections between the horizontal members of said elbow-levers and the front ends of said carrier-arms, means connected with the downwardly-extending members of said elbow-levers to move the same to raise and lower the carrier-arms, and a strap secured at one end to the said shaft and provided at its other end with means for attachment to a harness.

7. In a check attachment for vehicles, brackets secured to a vehicle-axle, carrier-arms pivotally connected at their rear ends with the said brackets, the said carrier-arms each consisting of a rear horizontal member and an upwardly and forwardly extending member, the said carrier-arms each having an enlarged portion at the junction of its members, a shaft mounted to turn in the enlarged portions of the carrier-arms, friction-wheels carried by said shaft, elbow-levers supported on the vehicle-axle and having horizontal and vertical members, the horizontal members being connected by links with the front ends of said carrier-arms, means connected with the vertical members of the elbow-levers to move the latter to raise and lower the front ends of said carrier-arms and carry the said friction-wheels into or out of engagement with the hubs of the wheels of the vehicle, a pulley on the said shaft, and a strap bifurcated at its forward end and provided with means for attachment to the rings of a bit, the opposite end of the strap being secured to said pulley.

In testimony whereof I have signed my name to this specification in the presence of two subscribing witnesses.

SAMUEL LUTHER DUCKETT.

Witnesses:
PAUL M. NORTH,
A. W. FLANIGAN.